March 28, 1967 R. W. FAULKNER 3,311,767
ELECTRICAL APPARATUS
Filed June 9, 1964 3 Sheets-Sheet 1
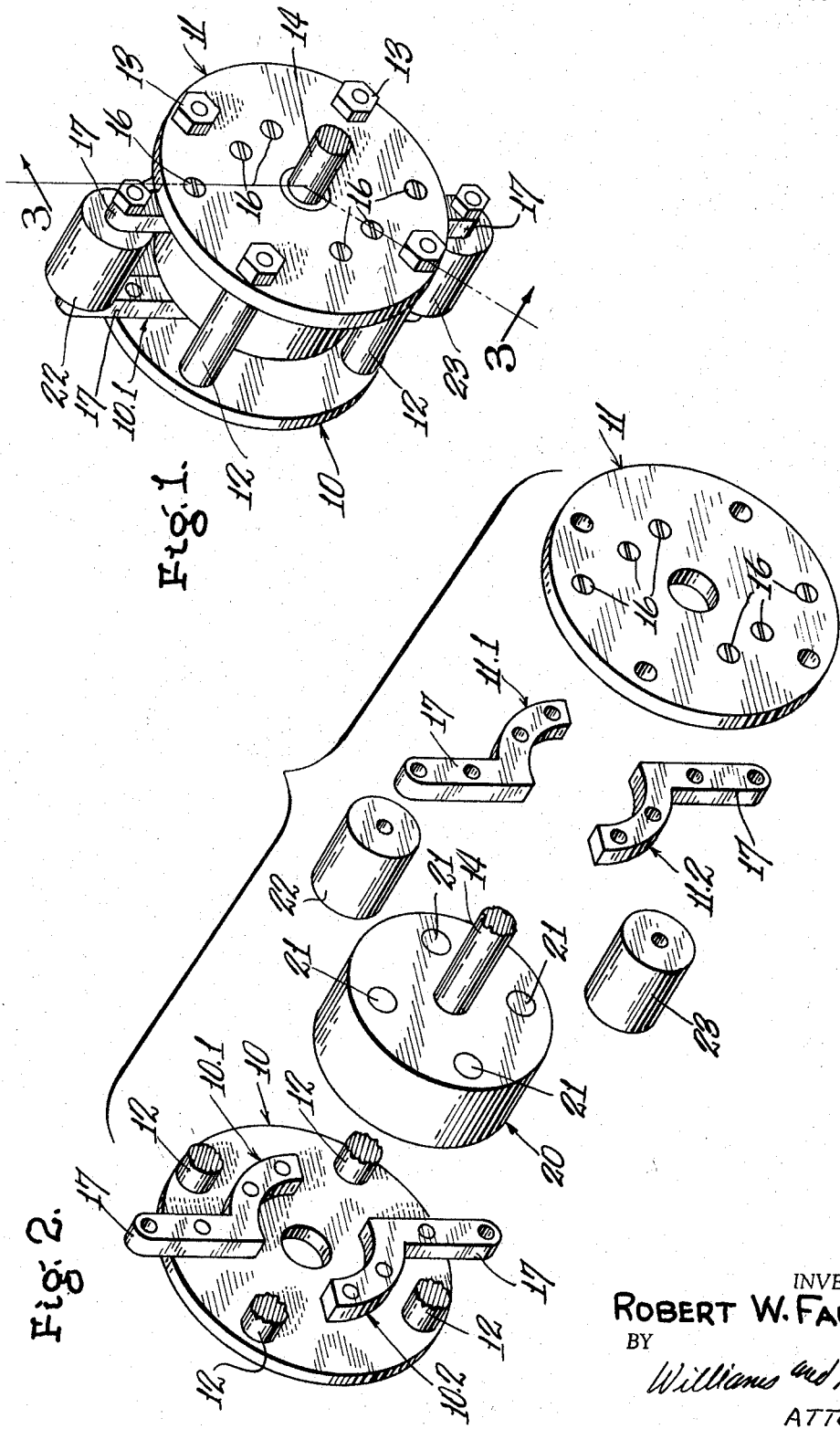
INVENTOR.
ROBERT W. FAULKNER
BY
Williams and Kraske
ATTORNEYS March 28, 1967  R. W. FAULKNER  3,311,767
ELECTRICAL APPARATUS
Filed June 9, 1964  3 Sheets-Sheet 2
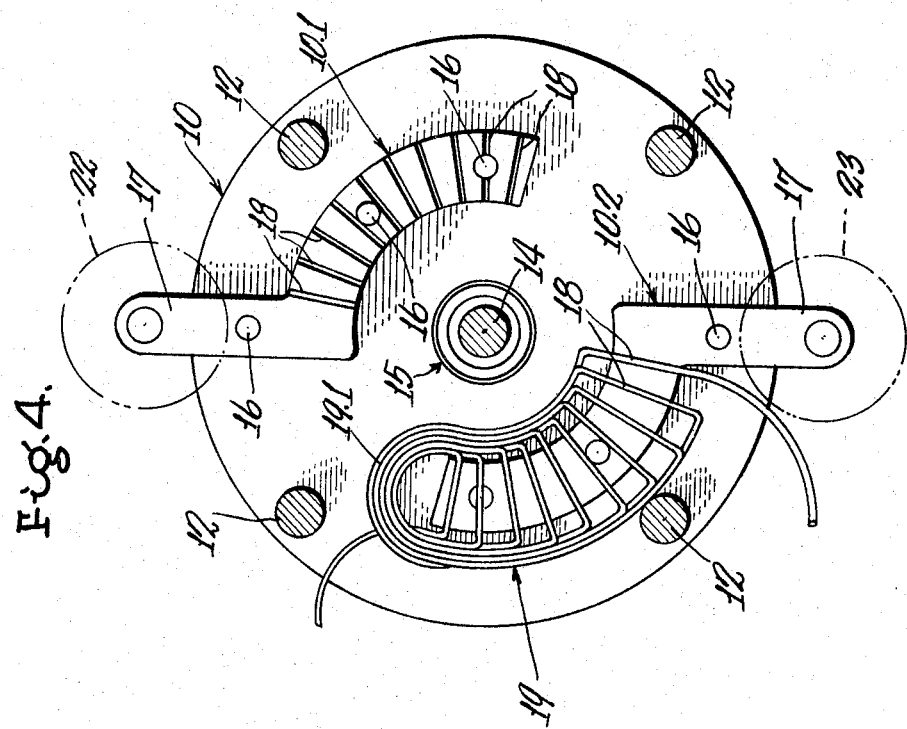
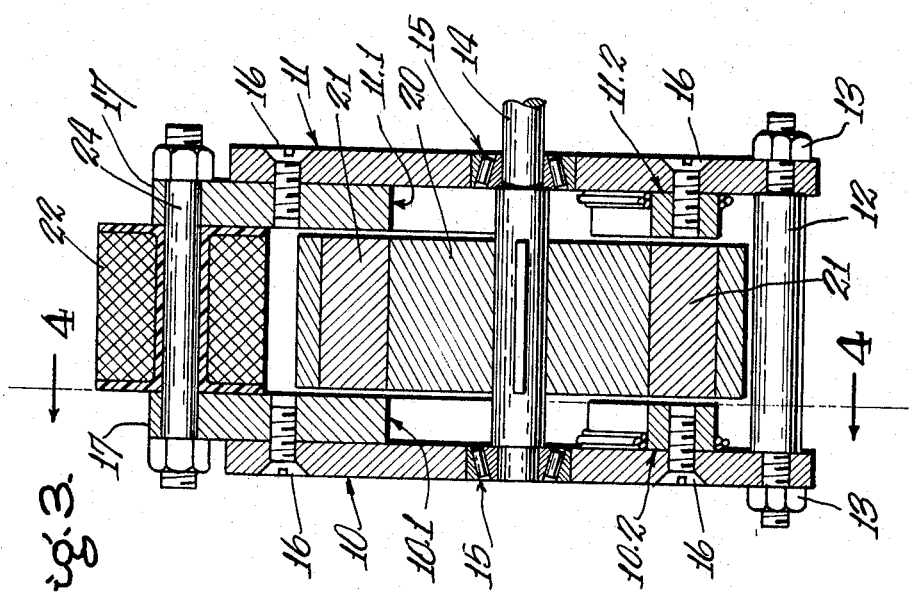
INVENTOR.
ROBERT W. FAULKNER
BY
Williams and Kreske
ATTORNEYS March 28, 1967 R. W. FAULKNER 3,311,767
ELECTRICAL APPARATUS
Filed June 9, 1964 3 Sheets-Sheet 3
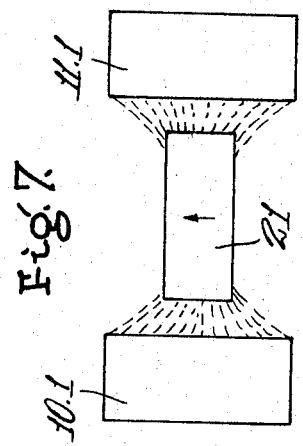
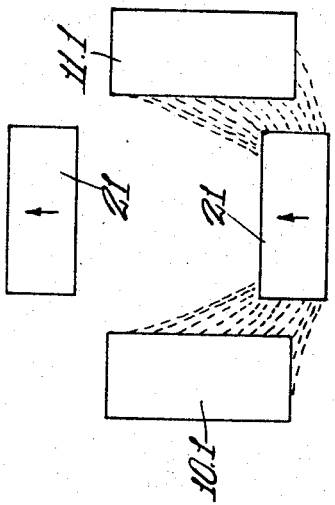
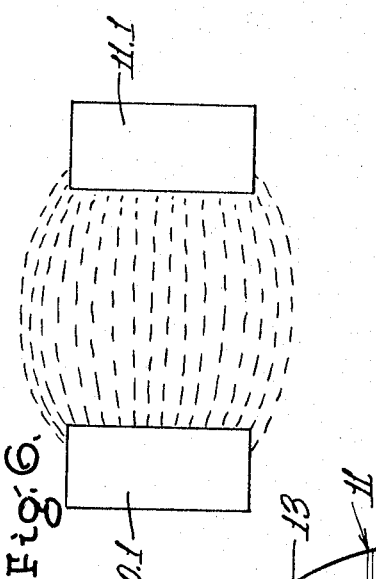
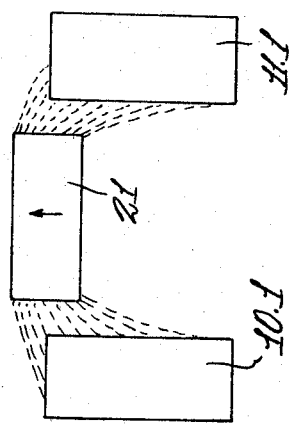
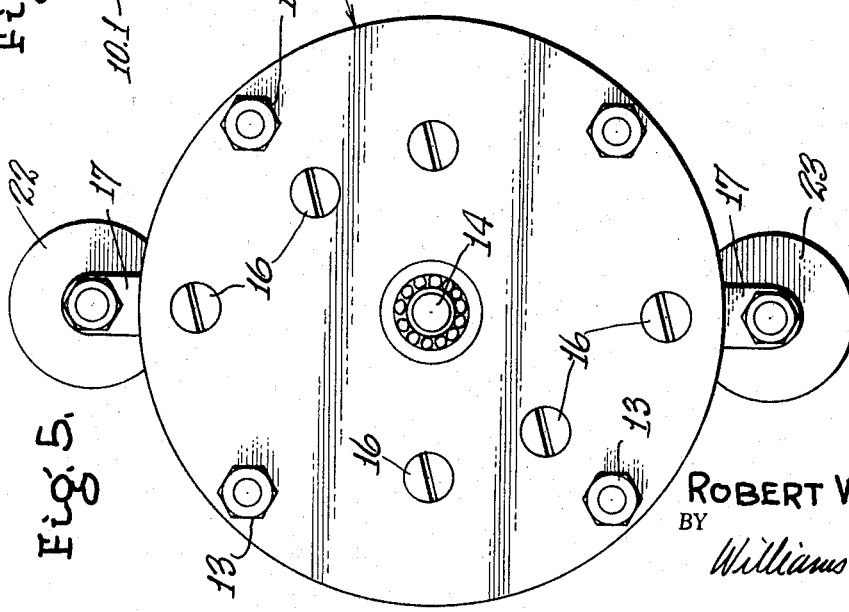
INVENTOR.
ROBERT W. FAULKNER
BY
Williams and Krenke
ATTORNEYS

United States Patent Office 3,311,767
Patented Mar. 28, 1967

---

3,311,767
ELECTRICAL APPARATUS
Robert W. Faulkner, R.D. 1, Box 59,
Garrettsville, Ohio 44231
Filed June 9, 1964, Ser. No. 373,652
16 Claims. (Cl. 310—168)

The present invention relates to apparatus for generating alternating current and the like and the principal object of the invention is to provide new and improved apparatus of the character described.

Conventional prior art generators, whether for generating alternating or direct current, utilize a rotating armature having armature windings for conducting electric current. Such generators also have a commutator or slip rings which are carried by the armature and which engage stationary brushes for carrying electrical energy to the armature windings.

It is well-known that any armature, i.e., a rotating member carrying electrical windings, has limited rotational speed potentialities. This results from the fact that at high rotational speeds of an armature, centrifugal force tends to cause the windings to separate from the armature core and fly radially outwardly. Similarly, where a commutator is used, the commutator segments tend to fly radially outwardly under high armature rotational speeds in a manner similar to the armature windings. Finally, high armature rotational speeds tend to cause poor electrical contact between the brushes and the commutator or slip rings thus leading to arcing, loss of efficiency and rapid deterioration of the brushes and the slip rings or commutators.

Because of the foregoing, conventional generators are operated at relatively low rotational speeds and, when they are driven by a high speed source of power, suitable gearing or the like must be employed, at considerable cost, complexity and weight, to keep armature speeds below the danger point.

With the ever increasing use of gas turbine engines, whose turbines rotate in excess of fifty thousand revolutions per minute, there has developed a great need for an electrical generator capable of being rotated directly by the turbine without the use of intermediate, speed-reducing gears or the like.

The present invention provides an alternating current generator whose rotating member contains no windings and thus may be termed a rotor. Since there are no armature windings and no slip rings or commutator, there is, for all practical purposes, virtually no limitation on rotational speeds. A generator of the type hereinafter to be disclosed may be coupled directly to a turbine or other very high-speed power source without intermediate gearing. The present generator, moreover, is simple, low in initial cost, and extremely trouble-free in operation. These and other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a perspective view of a simple, preferred embodiment of the invention, FIGURE 2 is an exploded perspective view of the apparatus seen in FIGURE 1, certain parts being omitted in the interest of simplicity, FIGURE 3 is an enlarged sectional view generally corresponding to the line 3—3 of FIGURE 1, FIGURE 4 is a sectional view generally corresponding to the line 4—4 of FIGURE 3, certain of the electrical windings being omitted in the interest of clarity, FIGURE 5 is an end elevational view of the output end of the apparatus, and FIGURES 6 through 9 are diagrammatic views illustrating the manner in which the apparatus is believed to operate.

With reference to FIGURES 1, 2 and 3, the apparatus chosen to illustrate the invention presently comprises a pair of circular, non-magnetically permeable end plates 10, 11 mounted in face-to-face, axially spaced relation by stepped diameter spacer studs 12 and accompanying nuts 13. A rotor shaft 14 is rotatably carried by the plates 10, 11 on tapered roller bearings 15, the shaft extending beyond the plate 11 for connection to a rotating power source. Although not shown, the plates 10, 11 may be provided with the usual mounting feet or the like.

As best seen in FIGURES 2 and 3, end plates 10, 11 have arcuate, magnetically-permeable pole pieces 10.1, 11.1 respectively, secured thereto in opposed, axially-spaced, aligned relation by means of screws 16, to form what will hereinafter be referred to as a pair of pole pieces. Note that such pole pieces are spaced radially outwardly of the shaft 14, are disposed on one side of the latter, and partially embrace such shaft. Pole pieces 10.1, 11.1 extend about the shaft 14 through an arc somewhat greater than ninety degrees. Each pole piece 10.1, 11.1 has an integral, radially outwardly extending, apertured ear portion 17 for a purpose to appear.

Also carried by respective end plates 10, 11 are pole pieces 10.2, 11.2 which are identical to those heretofore described and which form another pair of pole pieces on the opposite side of the shaft 14. As illustrated, pole pieces 10.2, 11.2 also have the previously mentioned ear portions 17.

With reference now to FIGURE 4, those faces of pole pieces 10.1, 10.2 spaced from the end plate 10 are provided with radially extending, circumferentially spaced slots 18 for receiving certain electrical windings 19, only one of which has been shown in FIGURE 4. Each winding 19 may comprise a suitably insulated electrical conductor which is passed radially inwardly through the pole slot 18 nearest the pole portion 17, along the inside of pole piece 10.2, around its end opposite the pole piece portion 17, along the outside of the pole piece and then radially inwardly through the next adjacent slot 18, along the inside of the pole piece, etc., until all of the pole piece slots have been filled. Note that each winding 19 thus provides a plurality of convolutions in series relation with a portion of each convolution extending through a pole piece slot 18 and with another portion of each convolution spaced from the pole piece as indicated by the reference character 19.1. Note also, that the convolutions of the winding 19 lie substantially flat against the end plate 10 or stated alternatively, in a plane substantially normal to the rotational axis of shaft 14. Pole pieces 11.1 and 11.2 are slotted in the same manner as above described and each of such pole pieces, together with pole piece 10.1 has a winding 19 similar to that seen in FIGURE 4.

As best seen in FIGURE 3, a rotor 20 of aluminum or other non-magnetically permeable material is keyed to the shaft 14 for rotation therewith between the pairs of pole pieces. For maximum efficiency, the axial air gap between the rotor 20 and the pole pieces will be as small as practicable and for this reason, accurate axial location of the shaft 14 is essential.

Still referring to FIGURE 3 but as also may be seen in FIGURE 2, rotor 20 presently carries four magnetically permeable bar-like pieces 21 which are embedded therein. Such pieces 21 extend from end-to-end of the rotor, are spaced circumferentially and equally thereabout, and are spaced radially outwardly of the shaft axis an amount to align with the arcuate portions of the pole pieces.

Preferably, pieces 21 will have a cross-sectional size approximately equal to the width of the arcuate portions of the pole pieces. As will appear, the arrangement of parts is such that during rotation of shaft 14, the rotor pieces 21 will successively pass between the pole pieces 10.1, 11.1 and 10.2, 11.2. While four pieces 21 are herein shown, it is to be understood that a greater or lesser number could be employed.

Means are provided for causing magnetic flux to flow between the pole pieces of each pair and in the present embodiment, suitable electromagnets 22, 23 are mounted between respective adjoining pole piece ear portions 17. A magnetically permeable bridge piece, or core 24, extends between such ear portions and through respective electromagnets.

Assuming that electromagnet 22 is connected to a suitable source of electrical energy, magnetic flux will be caused to flow between the pole pieces 10.1, 11.1 as illustrated in FIGURE 6. Although, not shown, it will be understood, of course, that the same phenomenon will take place between the pole piece 10.2, 11.2 when electromagnet 23 is energized. Accordingly, the remaining discussion of operation will refer only to pole pieces 10.1, 11.1 it being understood that the discussion is equally applicable to pole pieces 10.2, 11.2.

When rotor 20 has been rotated to position a rotor piece 21 between the pole pieces 10.1, 11.1, it will be noted that the magnetic lines of flux tend to flow through the rotor piece since it provides a lower reluctance path than does the air gap between such pole pieces. As rotor 20 rotates and moves the rotor piece 21 in the direction of the arrow (FIGURES 7 and 8), such rotor piece draws the magnetic lines of flux along with it. This movement of the flux lines cuts across those portions of the windings in the pole piece slots and induces current in the windings in accordance with well-known electrical theory. Continued rotation of the rotor will cause the rotor piece 21 above-described to pass from between the pole pieces 10.1, 11.1 as the next successive rotor piece 21 enters between such pole pieces (FIGURE 9). When the flux line path provided by such next rotor piece becomes lower in reluctance than that provided by the previous rotor piece, the lines of flux will snap back to pass through such next rotor piece, as illustrated in FIGURE 9. Continued rotation of the rotor will cause the cycle to be repeated as each rotor piece successively sweeps between the pole pieces.

Since the pole pieces 10.1, 10.2 are identical and are in opposed relation and the pole pieces 11.1, 11.2 are respectively aligned therewith, and since an even number of rotor pieces 21 are evenly spaced about the rotor axis, a rotor piece will enter between and traverse the pole pieces 10.1, 11.1 precisely at the same time that the opposite rotor piece 21 enters between and traverses the pole pieces 10.2, 11.2. The current thus generated by each of the windings 19 as previously described is in phase and therefore the ends of the windings 19 may be connected together in either series or parallel relation depending upon whether voltage output or current output is to be accentuated.

While the present apparatus has been described thus far as being used as a generator, it is also well-adapted for use as a brake to dissipate the energy in a rotating body. While conventional generators are used for this purpose, such conventional generators require connection to an external, electrical load, such as a bank of resistors, to change the current generated to heat. In contrast, the present device used in such application requires no electrical load and, indeed, is even simpler in structure than was heretofore described since the windings 19 may be omitted.

Bearing in mind the previously described operation of the device with respect to FIGURES 6 through 9, it will be understood that power is required to cause the rotor pieces 21 to traverse the pole members so long as a magnetic field exists therebetween. This attends because work is expended in shifting and stretching the lines of magnetic flux. The force required to turn the rotor is probably at a maximum in the position of parts seen in FIGURE 8.

In using the present device as a brake, the rotor shaft will, of course, be connected to the rotating body which is to be braked. The braking force exerted by the device may readily be controlled by varying the strength of the magnetic field existing between the pole members. This can quite simply be effected by varying the amount of current flowing through the electromagnets 22 which generate such field.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Electrical apparatus comprising a rotatably mounted shaft, a pair of fixedly positioned, magnetically permeable pole members positioned on one side of said shaft and spaced axially thereof, magnetically permeable means providing a low reluctance path between said pole pieces, said means being carried by and rotatable with said shaft toward and away from between said pole pieces, and an electrical conductor carried by respective pole pieces and each providing a plurality of serially arranged convolutions lying substantially normal to the rotational axis of said shaft.

2. The construction of claim 1 wherein electromagnetic means creates a magnetic flux field between said pole members.

3. The construction of claim 2 wherein said pole members extend about and partially embrace said shaft.

4. Electrical apparatus comprising a rotatably mounted shaft, a pair of fixedly positioned, magnetically permeable pole members positioned on one side of said shaft and spaced axially thereof, magnetically permeable means providing a low reluctance path between said pole pieces, said means being carried by and rotatable with said shaft toward and away from between said pole pieces, an electrical conductor carried by respective pole pieces and each providing a plurality of serially arranged convolutions, a magnetically permeable bridge extending between said pole members, and electromagnetic windings surrounding said bridge.

5. The construction of claim 4 wherein each pole member has a radially outwardly projecting ear and wherein a magnetically permeable core extends between respective ears aforesaid to provide said bridge.

6. The construction of claim 5 wherein the serially arranged conductor convolutions lie substantially normal to the rotational axis of said shaft.

7. Electrical apparatus comprising a pair of non-magnetic plate members secured to each other in spaced, face-to-face relation, a shaft extending between and rotatably carried by said plate members, a pair of magnetically permeable pole members, said pole members being affixed to the facing sides of respective plate members and being positioned on one side of said shaft in radially spaced relation therefrom and also being spaced from each other axially of said shaft, and magnetically permeable means providing a low reluctance path between said pole pieces, said means being carried by and rotatable with said shaft toward and away from between said pole pieces.

8. The construction of claim 7 wherein said apparatus generates current and wherein an electrical conductor is carried by respective pole pieces and wherein each conductor provides a plurality of serially arranged convolutions lying substantially normal to the rotational axis of said shaft.

9. The construction of claim 8 wherein a second pair of pole pieces are carried by said plate members but on the opposite side of said shaft from said first-mentioned pole piece pair.

10. The construction of claim 9 wherein each of said pole pieces extend about and partially embrace said shaft.

11. The construction of claim 10 wherein a magnetically permeable bridge extends between the pole pieces of each pair and wherein electromagnetic windings surround said bridges.

12. Electrical apparatus comprising a rotatably mounted shaft, a pair of fixedly positioned, magnetically permeable pole members positioned on one side of said shaft and spaced axially thereof, magnetically permeable means providing a low reluctance path between said pole pieces, said means being carried by and rotatable with said shaft toward and away from between said pole pieces, and electromagnetic windings for generating a magnetic field between said pole members.

13. The construction of claim 12 wherein a magnetically permeable bridge extends between said pole members and wherein said windings surround said bridge.

14. Electrical apparatus comprising a rotatably mounted shaft,
a pair of magnetically permeable pole members in side-by-side relation and spaced apart from each other axially of said shaft, said pole members having curved portions arranged in an arc about said shaft,
means at one end of said pole member portions for generating magnetic flux therebetween, and
magnetically permeable means carried by and rotatable with said shaft toward and away from between said pole member portions.

15. The construction of claim 14 wherein a second pair of pole members are spaced circumferentially of said shaft from said first pair of pole members,
and wherein the curved portions aforesaid of respective pole members extend in the same direction about said shaft from said one end of respective pole members.

16. The construction of claim 14 wherein said apparatus generates current, wherein an electrical conductor is carried by one of said pole pieces,
wherein said conductor has a plurality of legs arranged in a spoke-like pattern about said shaft,
and wherein said legs are electrically connected together in series relationship.

References Cited by the Examiner
UNITED STATES PATENTS

| 175,361 | 3/1876 | Livingston | 310—68 |
| 3,061,805 | 10/1962 | Bruderson | 310—68 |
| 3,116,431 | 12/1963 | Baudot | 310—268 |
| 3,171,051 | 2/1965 | Burr | 310—268 |
| 3,247,407 | 4/1966 | Bruneel | 310—168 |

References Cited by the Applicant
UNITED STATES PATENTS

| 579,012 | 3/1897 | Schaeffer. |
| 1,823,217 | 9/1931 | Sparkes. |
| 2,669,670 | 2/1954 | Eggers. |
| 2,796,542 | 6/1957 | Bekey. |

MILTON O. HIRSHFIELD, *Primary Examiner.*

L. L. SMITH, *Assistant Examiner.*